United States Patent [19]
Van Exel et al.

[11] 3,804,486
[45] Apr. 16, 1974

[54] ADAPTER STAND FOR CONVERTING A BINOCULAR TO A MICROSCOPE

[75] Inventors: Gerrit A. Van Exel, Fullerton; Alfred A. Akin, Jr., West Covina, both of Calif.

[73] Assignee: Bausch & Lomb Incorporated, Rochester, N.Y.

[22] Filed: July 20, 1972

[21] Appl. No.: 273,450

[52] U.S. Cl. .................. 350/18, 350/36, 350/84, 350/86
[51] Int. Cl. .......................................... G02b 21/24
[58] Field of Search ............ 350/35, 36, 84, 86, 87, 350/18, 91

[56] References Cited
UNITED STATES PATENTS

| 3,173,984 | 3/1965 | Vogl | 350/18 X |
| 2,433,674 | 12/1947 | O'Brien | 350/50 |
| 2,517,170 | 8/1950 | Bernard | 350/36 |
| 3,434,772 | 3/1969 | Fogle | 350/35 |
| 2,901,942 | 9/1959 | Tackaberry | 350/36 X |
| 2,765,718 | 10/1956 | Beecher | 350/18 |

Primary Examiner—David H. Rubin
Attorney, Agent, or Firm—Christie, Parker & Hale

[57] ABSTRACT

An adapter stand which enables use of a conventional binocular as a microscope. The binocular is supported on a platform which is movable with respect to a specimen stage on the stand for focusing. An auxiliary objective lens on the platform is aligned with one monocular optical system of the binocular to convert the monocular to a low-power microscope.

10 Claims, 5 Drawing Figures

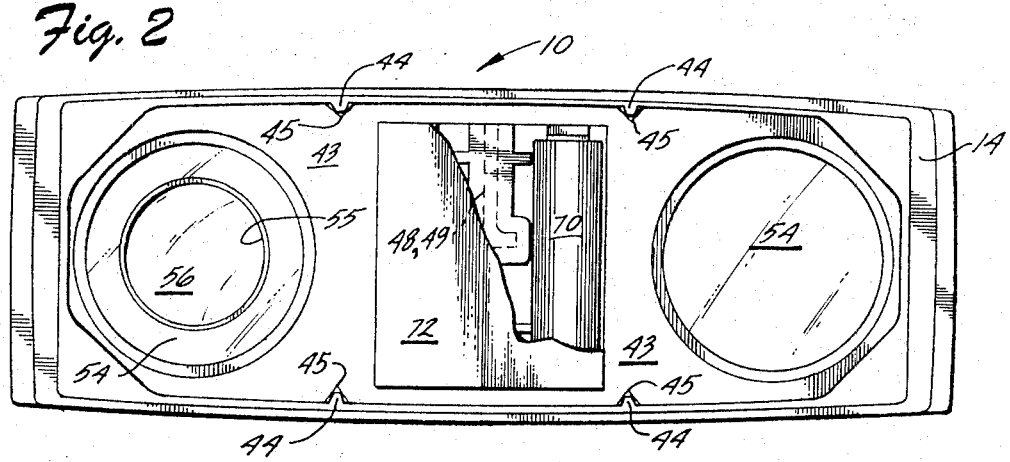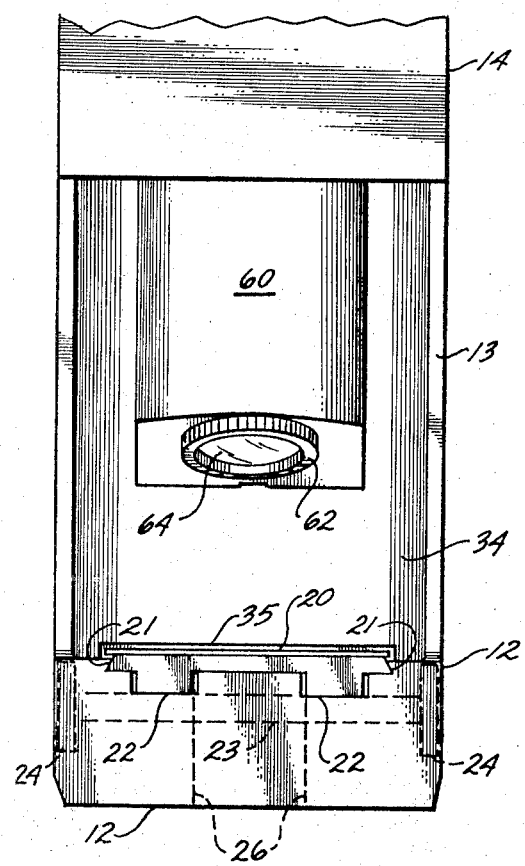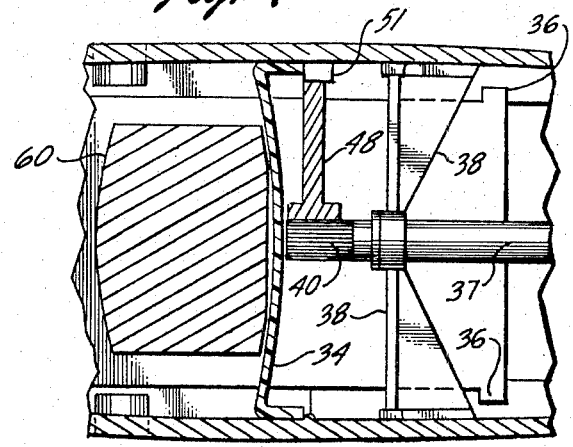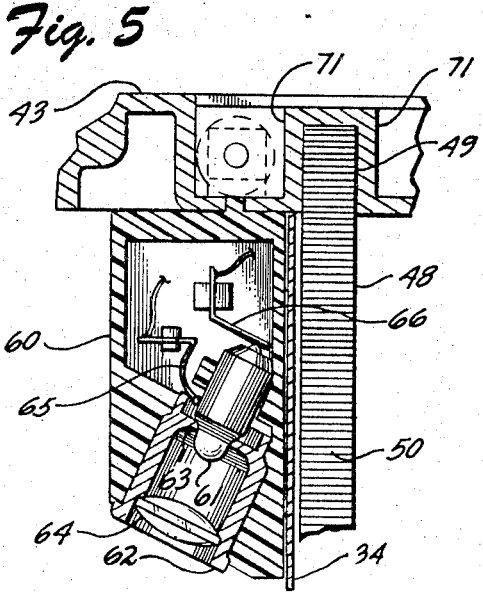

ADAPTER STAND FOR CONVERTING A BINOCULAR TO A MICROSCOPE

BACKGROUND OF THE INVENTION

Improved optical-equipment manufacturing methods during the last few decades have led to the marketing of a variety of relatively inexpensive binoculars. These binoculars are now in widespread use for many viewing applications such as hunting and spectator sports, and a binocular is the one optical instrument which many families now own.

This invention extends the utility of a conventional binocular by providing a supporting stand and auxiliary lens which permit the binocular to be used as a microscope. The auxiliary lens in conjunction with the conventional optics in one monocular of the binocular provide a relatively low-power microscope which is easy to use, has educational value, and provides good magnified viewing of gross specimens which are usually of interest to youngsters and amateur scientists.

SUMMARY OF THE INVENTION

Briefly stated, this invention relates to a stand for adapting a conventional binocular for use as a microscope. The stand includes an upright frame with a base, and a portion of the base forms a stage for positioning a specimen for microscopic examination. A platform is mounted on the frame and has an opening therethrough. The platform supports the binocular with an objective lens of the binocular positioned over the opening. The platform and stage are movable with respect to each other, and preferably the platform is movably mounted with respect to a stationary stage.

An auxiliary lens is secured to the platform in the opening, and the auxiliary lens enables the associated or monocular optics to be focused on a specimen on the stage. The auxiliary lens further serves to increase the optical power of the monocular. The auxiliary lens and associated monocular objective lens are stationary with respect to each other, and move together as the platform is moved with respect to the stage for focusing.

In a preferred form, a battery operated lamp is secured to the platform to illuminate the specimen. The specimen stage is movable to align the specimen for viewing purposes, and the stage can also be retracted out of the field of view to permit examination of objects beneath the base of the stand. The platform includes a depression or well which seats the monocular objective in approximate alignment with the auxiliary lens, and the binocular is freely removable from the platform and stand so it can be instantly converted to conventional binocular use.

BRIEF DESCRIPTION OF THE DRAWINGS

FIG. 2 is a view on line 2—2 of FIG. 1 showing a binocular-supporting platform of the adapter stand;

FIG. 3 is a view on line 3—3 of FIG. 1 showing a side view of a specimen stage and lamp housing on the adapter stand;

FIG. 4 is a sectional view on line 4—4 of FIG. 1 showing a platform elevating mechanism; and FIG. 5 is a front sectional elevation of the lamp housing.

DESCRIPTION OF THE PREFERRED EMBODIMENT

Figure 1:
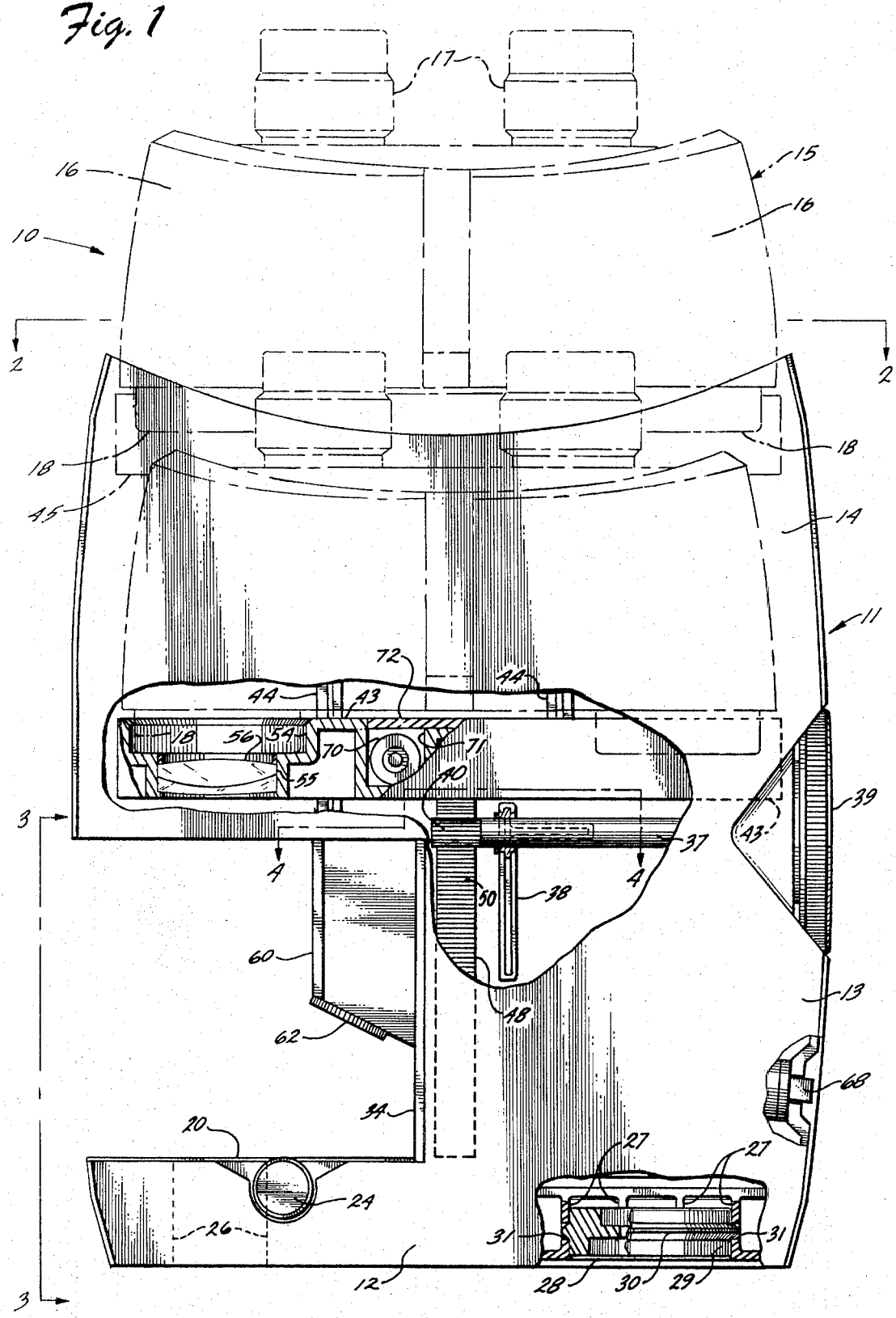
FIG. 1 is a front elevation, partly broken away and in section, of an adapter stand according to the invention.

An adapter stand 10 according to the invention is shown in FIGS. 1 and 2. The stand includes a generally C-shaped frame or housing 11 formed as a hollow shell, and having a base 12, and intermediate section 13 extending upwardly from a portion of the base, and an upper section 14 secured to the intermediate section and overhanging the base. The top of upper section 14 is open so a binocular 15 (shown in phantom in FIG. 1) can be inserted into the top of the adapter stand.

Binocular 15 is of a conventional type having a pair of monocular telescopes 16 each having an ocular-lens housing 17 and an objective-lens housing 18. Binocular 15 has one of the usual focusing arrangements such as a center-focus mechanism (not shown) which adjusts both ocular lenses simultaneously, or individual focus adjustments on the several ocular lens assemblies.

A specimen stage 20 is formed as a horizontal panel engaged in dovetail grooves 21 in base 12 (FIGS. 1 and 3). A pair of gear-tooth racks 22 extend along the length of the underside of specimen stage 20. A pinion shaft 23 is rotatably mounted on the base beneath the specimen stage in engagement with racks 22, and a pair of knobs 24 are mounted at opposite ends of the shaft. Rotation of knobs 24 drives the specimen stage along the base (to the right or left as viewed in FIG. 1) to position a specimen for viewing.

A hole 26 (shown in phantom in FIGS. 1 and 3) is formed through base 12 beneath the specimen stage, and the hole is exposed when the specimen stage is retracted toward intermediate section 13 of the stand. The hole permits viewing of objects beneath the base, and is useful for examining large specimens which cannot be placed on the stage.

Base 12 is of hollow construction with reinforcing cross ribs 27 (FIG. 1). In one portion of the base, the cross ribs are cut away to form a circular recess or socket 28 in which a camera adapter ring 29 is stored. An annular rib 30 on the periphery of adapter ring 29 fits into recesses 31 in the reinforcing ribs forming socket 28. Ribs 27 are formed of a slightly resilient material which enables the adapter ring to be snapped in and out of the socket. The adapter ring is configured to fit over ocular lens housing 17 of binocular 15, and the ring enables a camera to be mounted on the ocular housing to photograph a specimen being examined. The ring thus serves as a female coupler which receives and aligns the lens housings of the camera and binocular.

Intermediate section 13 of the adapter stand is open on the side facing specimen stage 20, and this opening is closed by a curved panel 34 (FIGS. 1 and 3–5) which is cemented in place. Panel 34 has a clearance slot 35 (FIG. 3) in its undersurface to permit retraction of specimen stage 20 into intermediate section 13. The inner end of the specimen stage is retained within the intermediate section by a pair of tabs 36 (FIG. 4) which abut panel 34 when the stage is fully extended.

A rotatable shaft 37 (FIGS. 1 and 4) is journaled through the wall of the intermediate section, and is internally supported by a bracket 38 secured to the walls of the intermediate section. A focusing knob 39 is secured to the outer end of shaft 37, and gear teeth 40 are formed on the inner end of the shaft.

A horizontal platform 43 (FIGS. 1, 2 and 5) is fitted within hollow upper section 14 of the adapter stand. A plurality of vertical guide ribs 44 extend inwardly from the walls of the upper section into mating notches 45 in platform 43. Guide ribs 44 orient platform 43 so the platform can be vertically moved smoothly within the upper section.

A post 48 is rigidly secured in a socket 49 (FIG. 5) in the undersurface of platform 43, and the post extends downwardly from the platform within intermediate section 13 of the adapter stand. One face of post 48 defines a gear-tooth rack 50 which is in mating engagement with gear teeth 40 on shaft 37. Rotation of knob 39 and shaft 37 thus drives post 48 vertically, providing an adjustment means to raise or lower platform 43 within upper section 14 of the adapter stand.

A back-up support boss 51 (FIG. 4) extends inwardly from the inner wall of the intermediate section in horizontal alignment with shaft 37 and in contact with the back of post 48. Boss 51 maintains post 48 in vertical alignment, and prevents lateral deflection of the post which might disengage rack 50 from gear teeth 40.

A pair of spaced-apart circular depressions or wells 54 (FIGS. 1-2) are formed in the upper surface of platform 43 to receive objective lens housings 18 of binocular 15. Wells 54 align binocular 15 within the upper section of the adapter stand. The binocular is lowered into upper section 14 of the stand, and moved laterally until the objective-lens housings drop into the wells.

An opening 55 extends through platform 43 in one of wells 54 which is directly above specimen stage 20. An auxiliary objective lens 56 of a biconvex doublet type is secured to the platform within opening 55.

Lens 56 is substantially in optical alignment with the optical system of monocular telescope 16 positioned thereabove, and modifies the optical properties of telescope 16 to permit use as a microscope. That is, lens 56 serves to increase the power of the overall optical system monocular telescope to provide a system magnification substantially greater than that of the binoculars alone, and also to adjust the working distance and back focus of the monocular telescope to enable the optical system to be focused on a specimen on stage 20. Lens 56 is selected to provide a system magnification of about two or three times the "power" of the binocular, and a system magnification of say 15 times is suitable when using a six-power binocular.

A hollow lamp housing 60 is rigidly secured to the undersurface of platform 43, and an incandescent lamp 61 (FIG. 5) is fitted within the housing. A tubular lens holder 62 is threaded into the bottom of lamp housing 60, and has an inwardly extending flange 63 at its inner end to hold lamp 61 in place. A biconvex lens 64 is secured within lens holder 62 to focus light from lamp 61 on the specimen stage.

A pair of spring-metal contacts 65 and 66 are mounted within lamp housing 60 in contact with the base and shell electrical connections on lamp 61. Contact 65 is spring biased away from the shell of the lamp, and is forced against the lamp shell by the end of lens holder 62. When the lens holder is unthreaded from lamp housing 60, contact 65 drops away from lamp 61, permitting the lamp to be removed for replacement.

Lamp 61 is in series electrical connection with a switch 68 mounted on the side of intermediate section 13, and a pair of batteries 70 fitted within recesses 71 in platform 43. A removable cover panel 72 is fitted over the batteries, and the batteries are replaced by fully elevating the platform and removing the cover panel.

In use, binocular 15 is inserted in upper section 14 of the adapter stand to seat objective lens housings 18 in wells 54. If necessary, the inter-ocular spacing of monocular telescopes 16 can be adjusted until the objective-lens housings fit into wells 54. A specimen is placed on specimen stage 20, and lamp 61 is illuminated if ambient light is inadequate.

The user then views the specimen through the monocular telescope positioned above auxiliary objective lens 56. Knob 39 is rotated to raise or lower the binocular until the specimen is in sharp focus. If the specimen is large, specimen stage 20 is retracted into intermediate section 13 to expose opening 26 through base 12, and the bottom of the base is positioned against the specimen.

The binocular is shown (in phantom view in FIG. 1) in fully raised and fully lowered positions to illustrate the wide range of available movement to accommodate specimens of varying size. The lamp housing moves with the platform and binocular during focusing, and thereby provides level illumination of the viewing area which is in focus.

An important advantage of the invention is that no modification of the binocular is required to enable its immediate use as a microscope. Furthermore, the binocular is not held in place by clamps or straps, and is instantly removable from the stand for use as a conventional binocular.

The adapter-stand housing and platform are preferably molded from ABS plastic, and the housing is most conveniently made in two halves which are subsequently secured together by cement. The entire assembly is inexpensive to produce, and is easy to use for children or others who are inexperienced in microscopy.

What is claimed is:

1. A stand which adapts a conventional binocular for use as a microscope, the binocular having a pair of monoculars each with a housing supporting an optical system including objective and ocular lenses with generally parallel optical axes, the stand comprising:
    an upright frame having a base, a portion of the base being a stage for positioning a specimen for microscopic examination;
    a platform mounted on the frame so the stage and platform are movable with respect to each other, the platform having an opening therethrough and being adapted to support the binocular over the stage with one of the monocular objective lenses over the opening, the platform being arranged to permit immediate removal of the binocular for use in conventional binocular viewing; and
    an auxiliary lens supported on the platform in the opening, the auxiliary lens enabling the associated monocular to be focused on a specimen on the stage and serving to increase optical power of the monocular, the auxiliary lens and associated monocular objective lens having a fixed spacing as the spacing of the platform and stage is varied during focusing.

2. The stand defined in claim 1 and further comprising a lamp secured to the platform for illuminating the stage.

3. A stand which adapts a conventional binocular for use as a microscope, the binocular having a pair of monoculars each with a housing supporting an optical system including objective and ocular lenses with generally parallel optical axes, the stand comprising:

- a C-shaped frame having a base, an intermediate section secured to and extending from the base, and an upper section secured to and extending from the intermediate section, the base having a portion forming a stage for positioning a specimen for microscopic examination, the upper section having a portion which overhangs and is open toward the stage;
- a platform mounted on the upper section of the frame to be movable toward and away from the stage, the platform having an opening therethrough and being configured to support a binocular in movable relation to the stage with one of the monocular objective lenses over the opening and in the overhanging portion of the upper section, the platform being arranged to permit immediate removal of the binocular for use in conventional binocular viewing;
- adjustment means connected between the frame and platform for adjusting the spacing of the stage and platform; and
- an auxiliary lens supported on the platform in the opening, the auxiliary lens enabling the associated monocular to be focused on a specimen on the stage and serving to increase optical power of the monocular, the auxiliary lens and associated monocular objective lens having a fixed spacing as the platform is moved with respect to the stage.

4. The stand defined in claim 3 in which the upper section of the frame is a hollow shell, and the platform is disposed within the shell, and further comprising means on the shell for guiding the platform to be smoothly movable with respect to the stage by the adjustment means.

5. The stand defined in claim 4 in which the adjustment means is a shaft rotatably supported on the frame and having a gear at one end thereof, and a gear rack secured to and extending from the platform in mating engagement with the shaft gear.

6. The stand defined in claim 4 and further comprising an adapter ring removably mounted on the frame, the ring being configured to couple a camera to the binocular.

7. The stand defined in claim 4 in which the frame upper section is configured to receive and partially enclose the binocular, the upper section being open at one end so the binocular can be freely removed and installed.

8. The stand defined in claim 7 in which the base has an opening therethrough, and in which the stage is defined by a panel movably mountd on the base, the panel being movable away from the opening to permit viewing of specimens beneath the base.

9. The stand defined in claim 7 and further comprising an illumination means secured to the platform for lighting the stage.

10. The stand defined in claim 9 in which the platform has a pair of spaced-apart depressions to receive the monoculars with one of the objective lenses in alignment with the auxiliary lens.

* * * * *